(12) United States Patent
Kikuchi et al.

(10) Patent No.: US 7,290,337 B2
(45) Date of Patent: Nov. 6, 2007

(54) MANUFACTURING METHOD FOR FRAME BODY AND FRAME BODY

(75) Inventors: Hiroaki Kikuchi, Okegawa (JP); Shoichi Takahashi, Okegawa (JP); Kiyoshi Tamaru, Okegawa (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/520,968

(22) PCT Filed: Jul. 10, 2003

(86) PCT No.: PCT/JP03/08771

§ 371 (c)(1),
(2), (4) Date: Jan. 10, 2005

(87) PCT Pub. No.: WO2004/007111

PCT Pub. Date: Jan. 22, 2004

(65) Prior Publication Data

US 2005/0223556 A1  Oct. 13, 2005

(30) Foreign Application Priority Data

Jul. 12, 2002  (JP) .............................. 2002-203981

(51) Int. Cl.
*B21K 21/06* (2006.01)

(52) U.S. Cl. ............................ 29/897; 29/515; 29/417; 72/68; 72/367.1

(58) Field of Classification Search .................. 29/897, 29/505, 515, 557, 417, 34 R, DIG. 18; 72/68, 72/356, 401, 370.26, 367.1
See application file for complete search history.

(56) References Cited

U.S. PATENT DOCUMENTS 1,610,383 A * 12/1926 Johnson ........................ 72/339
2,976,611 A *  3/1961 Giffen ......................... 228/151

(Continued)

FOREIGN PATENT DOCUMENTS

CN         1285249         2/2001

(Continued)

OTHER PUBLICATIONS

Englisch Translation of CN1285249A, translated by Schreiber Translations, Inc., Washington, D.C. Jul. 2006.*

(Continued)

*Primary Examiner*—David P. Bryant
*Assistant Examiner*—Christopher M. Koehler
(74) *Attorney, Agent, or Firm*—Darby & Darby

(57) ABSTRACT

In this manufacturing method for a frame body, after ring rolling a metal material to form a ring-shaped member, a rectangular member is formed by pressing and deforming this ring-shaped member in the radial direction. At this time, an angle of corner portions that impart the rectangular shape to the rectangular member is formed smaller than an angle of the frame body that is to be obtained by die forging the rectangular member. According to the frame body obtained by this manufacturing method for a frame body, it is possible to increase the mechanical strength, and in particular, the creep strength. Furthermore, when forming the frame body, the occurrence of defects during manufacture may be restrained, it becomes possible to realize a reduction of the amount of waste metal material and the manufacturing time, and thereby this frame body may be formed inexpensively.

6 Claims, 4 Drawing Sheets

U.S. PATENT DOCUMENTS

| | | | |
|---|---|---|---|
| 3,355,930 A | * | 12/1967 | Ivanovich .................... 72/377 |
| 3,736,846 A | * | 6/1973 | Frankenberg ................ 493/295 |
| 3,759,203 A | * | 9/1973 | Frankenberg ............ 72/370.05 |
| 4,744,237 A | * | 5/1988 | Cudini .................... 72/370.22 |
| 4,998,344 A | * | 3/1991 | Hsieh .................... 29/894.362 |
| 5,040,399 A | * | 8/1991 | Knapper et al. .............. 72/200 |
| 5,855,137 A | * | 1/1999 | Weber et al. ................. 72/398 |

FOREIGN PATENT DOCUMENTS

| | | |
|---|---|---|
| DE | 27 54 443 A1 | 6/1979 |
| JP | 2001-129636 | 5/2001 |
| JP | 2001-129637 | 5/2001 |
| JP | 2002-224792 | 8/2002 |
| JP | 2003-117632 | 4/2003 |

OTHER PUBLICATIONS

Updated English Translation of CN1285249A and accompanying electronic mail communication.*

International Search Report for PCT/JP03/08771 mailed Oct. 28, 2003.

Chinese Office Action issued on May 19, 2006 for Chinese Application No. 03816307.7 and its English translation.

English Abstract for Chinese Publication No. 1285249 published on Feb. 28, 2001.

* cited by examiner

MANUFACTURING METHOD FOR FRAME BODY AND FRAME BODY

CROSS-REFERENCE TO PRIOR APPLICATION

This is a U.S. National Phase application under 35 U.S.C. §371 of International Patent Application No. PCT/JP2003/008771 filed Jul. 10, 2003, and claims the benefit of Japanese Patent Application No. 2002-203981 filed Jul. 12, 2002 both of which are incorporated by reference herein. The International Application was published in Japanese on Jan. 22, 2004 as WO 2004/007111 A1 under PCT Article 21(2).

BACKGROUND OF THE INVENTION

1. Field of the Invention

The present invention relates to a manufacturing method for a frame body suitable for use in the manufacture of specific parts for such as turbine-operated apparatuses and the like.

Priority is claimed on Japanese Patent Application No. 2002-203981, the content of which is incorporated herein by reference.

2. Description of Related Art

Conventionally, in gas turbines for electrical generators and the like, a structure is known in which, in order to increase the jet velocity of the combustible gas to the turbine blades, a rectangular frame body is provided on the outlet of the heat chamber through which the combustion gas flows, that is, the open part on the turbine side, and the cross-sectional area of the flow path of the combustion gas is narrowed by this frame body. Generally, the frame body is structured such that the thickness in the direction along the open surface of this frame body differs at each of the opposing edges that impart this rectangular shape. Generally, the followings are known as a manufacturing method for this frame body.

First, among the edges that impart the rectangular shape to the frame body that is to be formed, a square bar is curve molded so as to form a rectangular shape. This square bar provides a cross-sectional dimension that is equal to the thickest width in the direction along the open surface of this frame body. At this time, both end surfaces of the square bar are abutted, these end surfaces are subsequently joined by flash butt welding, and a rectangular member is formed. In addition, cutting processes are applied to predetermined edges among the edges of this rectangular member, and the edges are formed to a predetermined thickness in the direction along the open surface. Thereby, a frame body is formed in which the thickness differs at each of the opposing edges that impart the rectangular shape. In addition, methods in which a blanking process and a cutting process are applied to form a frame body are generally well-known.

However, according to the conventional manufacturing method for a frame body, first, in the case in which the frame body is formed by using a square bar, it is necessary that the cross-sectional area of this square bar be completely uniform in the longitudinal direction, and thus after the rectangular member is formed by deforming, cutting processes must be applied to the edges that are thin. Thus, there is the problem in that a large amount of waste material is produced. Furthermore, the proportion of the manufacturing time for the frame body occupied by these cutting process time is high and thus the manufacturing time for the frame body required, and coupled with the problem of the waste, there is the problem in that the frame bodies become expensive. Next, in the case in which blanking processes and cutting processes are applied to a plate to form the frame body, material positioned on the plate at the opening of the frame body and the outside of the frame body becomes unnecessary, and thus there is the problem in that very large amount of waste material is produced. Furthermore, as described above, there are the problems that a processing time is protracted and the frame body becomes expensive.

SUMMARY OF THE INVENTION

In consideration of the problems described above, it is an object of the present invention to provide a manufacturing method for a frame body and a frame body that allows a reduction of the amount of waste material when forming the frame body and allows the frame bodies to be formed inexpensively.

In the manufacturing method for a frame body of the present invention, after ring rolling a metal material to form a ring-shaped member, and after forming a rectangular member by applying pressing in the radial direction and deforming to the ring-shaped member, the rectangular member is placed in a mold and pressing and die forging are carried out to form the frame body.

According to the manufacturing method for a frame body of the present invention, it becomes possible to form the frame body by restraining to a minimum the number of cutting process steps. Therefore, because it becomes possible to reduce the amount of waste metal material and shorten the manufacturing time for the frame body, it becomes possible to manufacture the frame body inexpensively.

In addition, because the frame body is formed from ring-shaped member that is formed by ring rolling, it is possible to make the grain flow continuous between each of the wall portions that form the frame body. Thereby, the grain flow of the frame body becomes continuous in the circumferential direction, and thus it becomes possible to realize an increase in the mechanical strength, in particular, the creep strength, against a force directed from the inside of the frame body towards the outside.

When forming the rectangular member, the angle of the corner portions that impart the rectangular shape to the rectangular member may be smaller than the angle of the frame body after die forging.

In this case, the angle of the corner portion that imparts the rectangular shape to the rectangular member may be formed smaller than the angle of the frame body, and thus it becomes possible to restrain the occurrence of underfills at the corner portion of the forged member when die forging the rectangular member. That is, this effect of restraining of the occurrence of underfills is particularly remarkable in the following cases.

When die forging the rectangular member, the rectangular member is pressed in the direction that is perpendicular to the direction along the open surface thereof, but when the angle of the rectangular member is large, the inner surface of the corner portion is bitten into by the mold, and thereby large burrs occur. As a result, underfills occur in parts of the frame body, that is, the outer surface. However, if the angle of the corner portion of the rectangular member is formed so as to be smaller, the inside surface of the corner portion is not bitten into by the mold, and thus it becomes possible to restrain the occurrence of burrs in the inside surface, and it becomes possible to restrain the occurrence of underfills.

Furthermore, when the angles of the rectangular member are formed so as to be smaller than those of the frame body to be formed, as a result, these corner portions project outside of this rectangular member, and it becomes possible to make the length of the circumference in the corner portion longer. In other words, it is possible to make the volume in the corner portion large, which means that it is possible to provide pads in these rectangular members. When die forging is applied to this rectangular member to form a frame body, it is possible to thicken the wall of the corner portion of this frame body. Therefore, it becomes possible to form corner portions that have thick walls. Therefore, the corner portions in the frame body at which stress is concentrated are thickened, and thus it is possible to form simply and reliably a high-strength frame body.

When forming the rectangular member, an insert may be disposed inside the ring-shaped member.

In this case, when forming the rectangular member from the ring-shaped member, the insert is placed inside the ring-shaped member and pressed, and thus it becomes possible to restrain the deformation of the rectangular member due to pressing by using the insert. Therefore, it become possible to form the rectangular member into the desired shape simply, and it becomes possible to provide the frame body inexpensively.

When forming the ring-shaped member, the height of the ring-shaped member in the axial direction may be formed to a height equivalent to a plurality of frame bodies, and using this ring-shaped member, after forming the rectangular member, this rectangular member may be cut at a height equivalent to one frame body, and subsequently each of the members may be die forged.

In this case, when forming the rectangular member, the height is formed to a height equivalent to the plurality of frame bodies to be formed, and subsequently, the rectangular member is cut at a height equivalent to one frame body, and these rectangular members are die forged separately to form the frame bodies. Thus, it becomes possible to form the frame bodies at a high efficiency, and it becomes possible to provide the frame bodies inexpensively.

The frame body of the present invention is a metal frame body segmented into a plurality of wall portions, and the grain flow runs along the longitudinal direction of the wall portions, and these wall portions are continuous with each other.

According to this frame body of the present invention, the grain flow runs along the longitudinal direction of each of the wall portions, and these wall portions are continuous with each other, that is, the wall portions and the grain flows are continuous in the circumferential. Thus, the mechanical strength, and in particular, the creep strength of this frame body is increased against a force directed from the inside towards the outside.

DETAILED DESCRIPTION OF THE INVENTION

Below, an embodiment of this invention will be explained with reference to the drawings. FIG. 1 through FIG. 7 are explanatory drawings for explaining the manufacturing method for the frame body illustrated in an embodiment of this invention.

Figure 1:
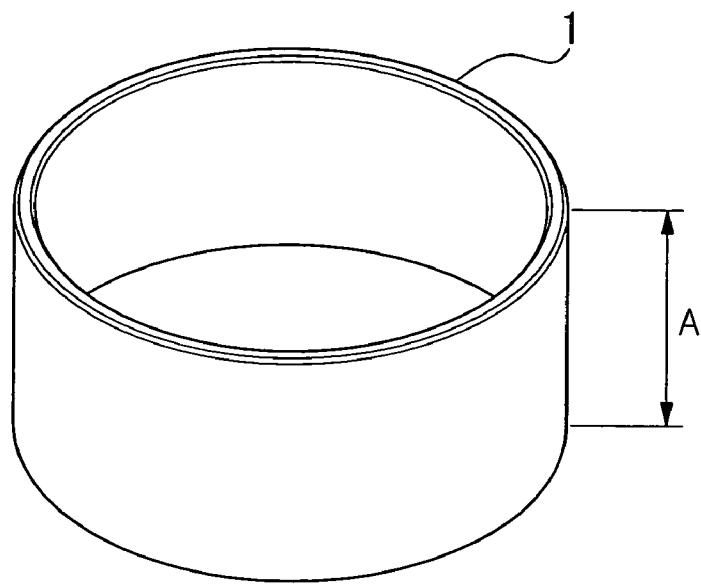
FIG. 1 through FIG. 5 are explanatory drawings showing the first through fifth steps of the manufacturing method for the frame body illustrated in an embodiment of the present invention.

First, a concavity is formed in the end surface of a metal (for example, a heat resistant metal such as a Ni based alloy) member that has been billet processed by heat forging, and then this forged member is formed into the ring-shaped member 1 shown in FIG. 1 by using a ring rolling mill. The height "A" of the ring-shaped member 1 in the axial direction is determined by taking into account the height in the direction perpendicular to the direction along the open surface of the manufactured frame body, the plastic deformation when pressing in a perpendicular direction during the die forging described below, and the number of frame bodies formed from one ring-shaped member 1 and so on. In the present embodiment, the height "A" is set such that it is possible to manufacture two frame bodies from one ring-shaped member 1.

Figure 2:
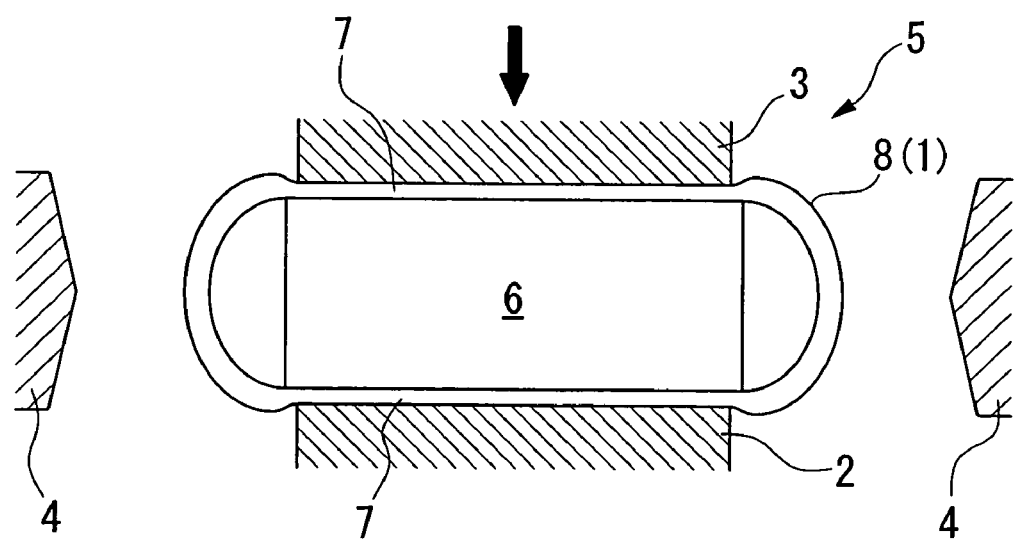

Here, the schematic structure of forging apparatus 5 that applies a curving process to the ring-shaped member 1 in the next step will be described. As shown in FIG. 2, the forging apparatus 5 has a base 2, a first punch 3 provided so as to be able to move reciprocally with respect to the surface of the base 2, and a set of second punches 4 provided so as to be able to approach and separate synchronously in a direction that is vertical to the direction of movement of the first punch 3. Here, the opposing surfaces of the base 2 and the first punch 3 have flat surfaces, and the opposing surfaces of the set of second punches 4 are curved surfaces that form convexities in opposing directions.

A method, in which the ring-shaped member 1 is curve molded by using the forging apparatus 5 formed described above, will be explained. First, the ring-shaped member 1 is installed on the surface of the base 2 that opposes the first punch 3, and at the same time, the insert 6 is disposed inside the ring-shaped member 1. Next, the first punch 3 is moved towards the surface of the base 2, the inner circumferential surface of the ring-shaped member 1 is abutted against the surface of the insert 6, and at the same time, the ring-shaped member 1 is pressed in the direction of movement of the first punch 3 to attain the desired thickness, and thereby a curve molded member 8 that provides first wall portions 7 is formed.

Figure 3:
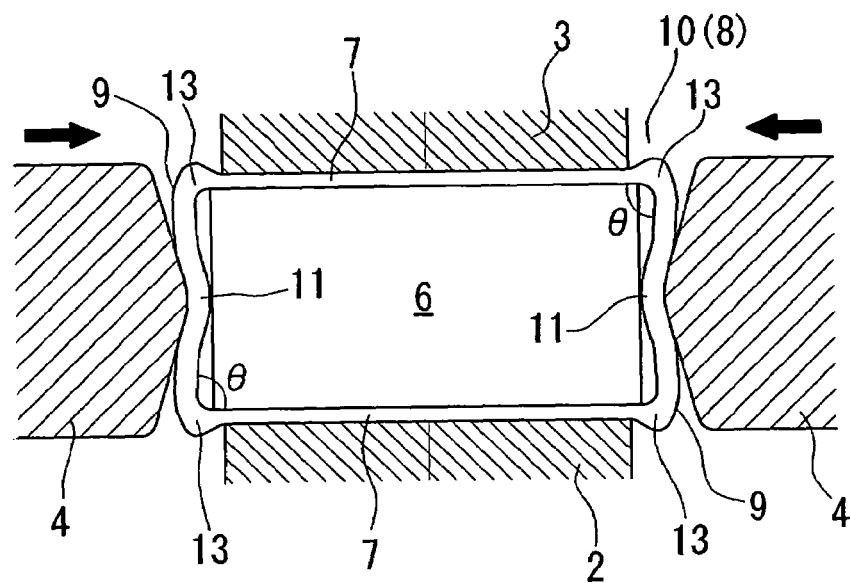

Subsequently, as shown in FIG. 3, the first punch 3 is being abutted against the surface of the first wall portions 7 of the curve molded member 8, and then, without retracting the first punch 3, the second punches 4 are synchronously moved towards each other until the surface of the portion of the inner circumferential surfaces of the curve molded member 8 on which the first wall portion 7 has not been formed abuts the surface of the insert 6. At this time, in the curve molded member 8, second wall portions 9 are formed on the surface where the first wall portions 7 have not been formed. Thereby, the first wall portions 7 and the second wall portions 9 are provided, and at the same time, a rectangular member 10 is formed that provides corner portions 13, where these corner portions 13 are connected to the first wall portions 7 and the second wall portions 9.

Here, the thickness of a first wall portion 7 is formed so as to be narrower than the thickness of a second wall portion 9 in the direction of movement of the second punch 4. In addition, due to the curved shape of the second punches 4, convexities 11 are formed at the middle of the second wall portions 9 in the direction of movement of the first punch 3, where this convexity 11 is convex towards the inside of the rectangular member 10.

Due to the formation of these convexities 11, the angle $\theta$ in the corner portions 13 is smaller than the angle formed in the case in which the convexities 11 are not formed, that is, in the case in which the surface of the second punch 4 that abuts the external circumferential surface of the rectangular member 10 is a flat surface. Accompanying this, the corner portion 13 acquires a shape that projects slightly towards the outside of the rectangular member 10. Note that in the present embodiment, the angle $\theta$ of the corner portion 13 is formed at an angle that is smaller than the angle $\theta 1$ of the part corresponding to the frame body 12 formed by the die forging described below, and in addition, the amount of the projection of the corner portion 13 is set such that there is no biting due to the part that forms the outside part of the corner portion 13 in a metal mold used during the die forging described below.

Figure 4:
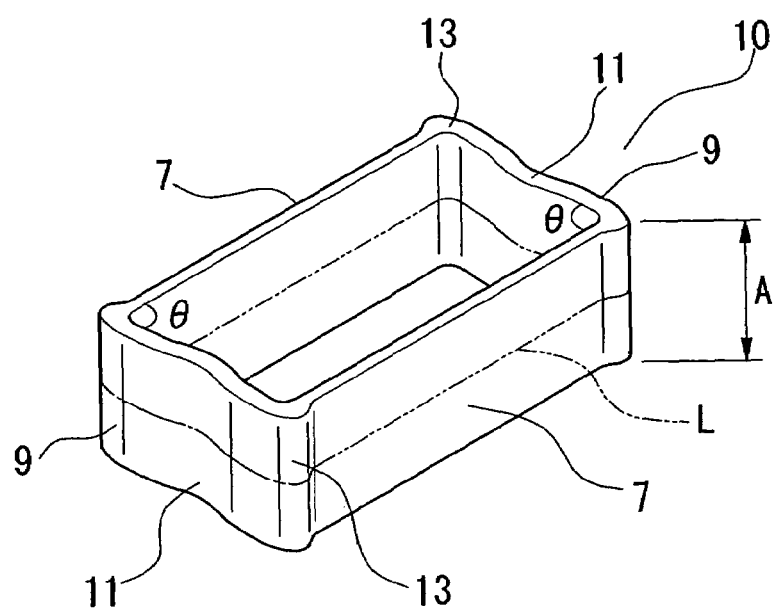

Subsequently, the rectangular member 10 is removed from the forging apparatus 5, and at the same time, after the insert 6 that has been disposed in the rectangular member 10 has been removed, as shown in FIG. 4, the rectangular member 10 is cut at a predetermined position L in the direction perpendicular to the direction along the open surface of the rectangular member 10. Thereby, two rectangular members 10 are formed that have a height that is one half the height "A".

Figure 5A:
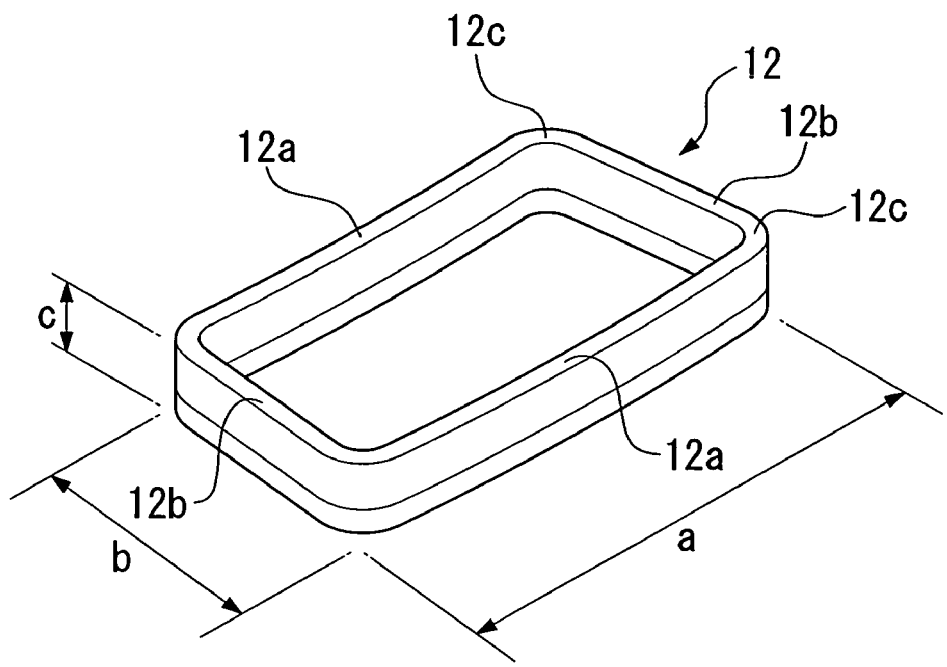

In addition, after installing this rectangular member 10 in the mold (not illustrated), the frame body 12 has a desired shape shown in FIG. 5A is formed by pressing and die forging this rectangular member 10 in the direction along the height "A".

Here, the angle $\theta$ in the corner portion 13 of the rectangular member 10 is formed smaller than the angle $\theta 1$ of the corresponding portion 12c in the frame body 12. Thereby, when die forging is applied to the rectangular member 10, in a metal mold (not illustrated) that moves towards and press-forms this portion 10, the portion that forms the inside of the corner portion 13 of this rectangular member 10 does not bite into the inside of this corner portion 13. Therefore, during this die forging, it is possible to restrain the occurrence of burrs in the inside part of the corner portions 13, and it is possible to restrain the occurrence of underfills in the outside part of the corner portion 13.

Figure 6:
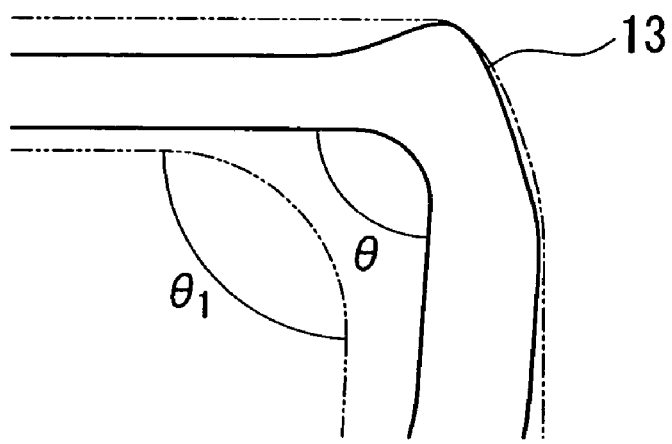
FIG. 6 is an enlarged plan view showing the corner of the rectangular member when the frame body is formed from the rectangular member shown in FIG. 4.
Figure 7:
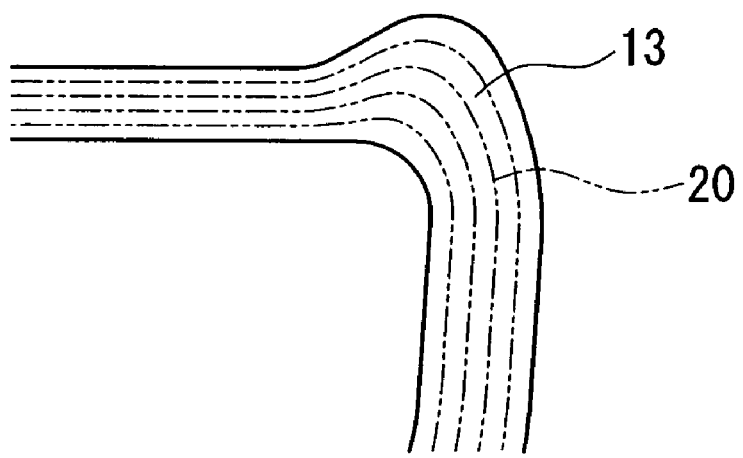
FIG. 7 is an enlarged plan view showing the corner of the rectangular member when the etching process has been applied to the rectangular member shown in FIG. 4.

Furthermore, when the angle $\theta$ of the rectangular member 10 is formed so as to be smaller than the angle $\theta 1$ of the frame body 12, as a result, as shown in FIG. 6, this corner portion 13 projects towards the outside of the rectangular member 10, and thereby it becomes possible to make the circumference in this corner portion 13 long. In other words, it is possible to make the volume in the corner portions 13 high, which means that it is possible to provide pads in these rectangular members 10. Thus, when die forging is applied to this rectangular member 10 to form the frame body 12, as shown by the chain lines in FIG. 6, it is possible to make the wall of the corner portion 12c of this frame body 12 thick. Therefore, it becomes possible to form the corner portions 12c, which are stress concentration locations in the frame body 12, with thick walls, and thus it is possible to form simply and reliably the high-strength frame body 12. Note that because the angle $\theta$ of the corner portion 13 of the rectangular member 10 widens to a desired angle $\theta 1$ in the frame body 12 during this die forging and that the amount of projection of the corner portion 13 is set as described above, the outside of the corner portion 13 is not bitten into by the part that forms the outside of the corner portion 13 in the metal mold during the die forging.

The frame body 12 formed as described above is formed by applying curving processes and die forging processes to the ring-shaped member 1 that has been formed by ring rolling, and thus the frame body 12 is extended in the longitudinal direction of long wall portions 12a and short wall portions 12b that form the frame body 12, and thus the grain flow is continuous between each of the wall portions 12a and 12b. That is, the grain flow in the circumferential direction of the frame body 12 is continuous. Here, the grain flow denotes the state in which the crystal structure of the metal material is arranged according to the deformation of this metal material due to the application of press-forming, and is also known as a flow line. In addition, it is known that the mechanical strength is higher in the direction along this grain flow than in the direction that is perpendicular thereto.

There are cases in which it is possible to visually confirm the grain flow as streaks on these surfaces by applying an etching process for 10 to 15 minutes to the ring-shaped member 1, the rectangular member 10, and the frame body 12, where this etching process uses a mixture of, for example, hydrochloric acid and hydrogen peroxide. For example, there are cases in which it is possible to visually confirm the grain flow 20 as shown by the chain lines in FIG. 7 in the corner portion 13 when the etching process has been applied to the rectangular member 10.

Figure 5B:
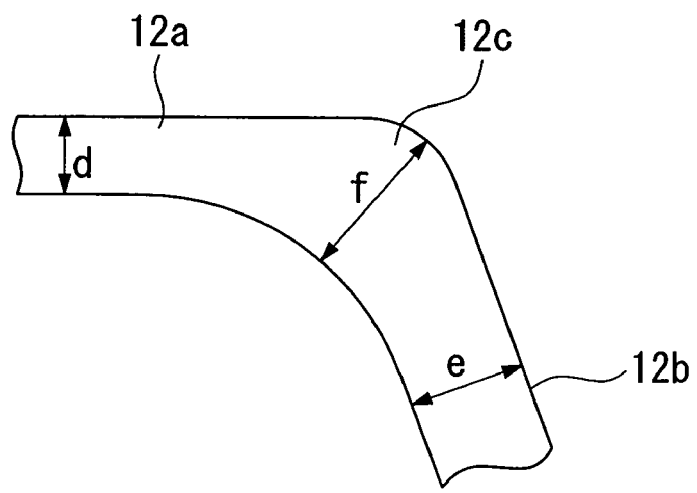

In addition, as shown in FIG. 5A and FIG. 5B, the frame body 12 can be formed, for example, with the following dimensions: the length "a" of the long wall portion 12a is approximately 500 mm, the length "b" of the short wall portion 12b is approximately 200 mm, the height "c" of the frame body 12 is approximately 50 mm, the thickness "d" of the long wall portion 12a is approximately 25 mm, the thickness "e" of the short wall portion 12b is approximately 30 mm, and the distance between the peak of the outer surface and the peak of the inner surface, that is, the wall thickness "f", of connection portion between the long wall portion 12a and the short wall portion 12b, that is a corner portion 12c of the frame body 12, is approximately 50 mm.

As explained above, according to the manufacturing method for the frame body according to the present embodiment, it is possible to form the frame body 12 by restraining to a minimum the cutting process time. Therefore, it becomes possible to reduce the amount of waste metal material and to shorten the manufacturing time for the frame body 12. Thus, it becomes possible to manufacture the frame body 12 at a low cost. In addition, when forming the second wall portions 9 and the corner portions 13, the angle $\theta$ of the corner portions 13 can be made smaller. That is, it becomes possible to form the angle $\theta$ of the corner portions 13 that is smaller than the angle formed when the surface of the second punch 4 that abuts the outer surface of the rectangular member 10 is flat, and furthermore, it is possible to form the angle $\theta$ of the corner portion 13 so as to be smaller than the desired angle $\theta 1$ in the frame body 12.

Thereby, when die forging the rectangular member to form the frame body 12, the metal mold does not bite into the inner surface of the corner portions 13, and thus it is possible to restrain the occurrence of burrs on the inner surface of the corner portions 13 and to restrain the occurrence of underfills in the outer surface of the corner portions 13.

In addition, because the insert 6 is disposed inside the ring-shaped member 1 and pressed when the rectangular member 10 is formed from the ring-shaped member 1, it becomes possible to limit the deformation due to the pressure by using the insert 6. Thus, it becomes possible to form the rectangular member 10 into the desired shape simply, and it becomes possible to provide the frame body 12 inexpensively.

In addition, taking into consideration the deformation of processing described above, the height "A" of the rectangular member 10 is formed in advance to a height equivalent to a plurality of the frame bodies 12, and after the rectangular member 10 is cut at the cutting positions L, the resulting rectangular members undergo die forging separately to form the frame bodies 12. Thus, it becomes possible to form the frame bodies 12 at a high efficiency, and it becomes possible to provide the frame bodies 12 inexpensively.

Furthermore, the frame body 12 is formed by applying curving process and die forging to the ring-shaped member 1 that has been formed by ring rolling, and thus it is possible to run the grain flow 20 in the longitudinal direction of each of the wall portions 12a and 12b that form the frame body 12. Thereby, it is possible to make the grain flow 20 continuous between each of the wall portions 12a and 12b via the corner portions 12c. That is, it is possible to make the grain flow continuous in the circumferential direction of the frame body 12. Thereby, it is possible to realize an increase in the mechanical strength, and in particular, the creep strength, against a force that is directed from the inside of the frame body 12 towards the outside.

Therefore, in a gas turbine for an electrical generator or the like, a particularly remarkable effect is attained when this frame body 12 is installed on the outlet of the heat chamber through which the combustion gas flows, that is, on the open part of the turbine side, for raising the jet velocity of the combustion gas to the turbine blades due to tighten the passage of the combustion gas. Specifically, when the frame body 12 is installed as described above, a large force directed from the inside of the frame body 12 towards the outside acts at a high temperature; therefore, although the creep strength is critical. Because the grain flow 20 is continuous in the circumferential direction of the frame body 12, it is possible to realize an increase in the creep strength of this frame body 12.

In addition, due to repeated starting and stopping of the gas turbine for an electrical generator, a temperature cycle is applied to the frame body 12, thus and thermal stress is repeatedly applied, thereby, the durability is critical. However, because the grain flow 20 is established as described above, it is possible to realize an improvement in the durability.

In particular, in the manufacturing method for the frame body according to the present embodiment, because it becomes possible to form thick corner portions 12c, which are locations of stress concentration in the frame body 12, it is possible to realize reliably an improvement in the mechanical stress and the durability.

Thereby, it becomes possible to provide a particularly suitable frame body 12 for use in an environment in which a high load is applied at a high temperature cycle.

Note that while preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. For example, the ring-shaped member 1 may be a non-perfect circle. In addition, the rectangular member 10 is not limited in rectangular shape, and any polygon is suitable. In addition, as shown in FIG. 3 and FIG. 4, the angle θ of the corner portion 13 is not limited to 90°, and for example, the rectangular member 10 may also be of a parallelogram or fan-shape. Furthermore, the height "A" of the rectangular member 10 was the height for two units, but the number may be equal to or greater than this or equal to 1.

The present invention relates to a method of manufacturing a suitable frame body in the manufacturing of a particular part such as a turbine driven apparatus. In this frame body, it is possible to make the grain flow continuous between each of the wall portions, it is possible to increase the mechanical strength, and in particular, the creep strength. Furthermore, when forming such a frame body, the occurrence of defects due to manufacturing is restrained, and it becomes possible to realize a reduction in the amount of waste metal material and the manufacturing time, and thereby it becomes possible to form the frame body inexpensively.

What is claimed is:

1. A manufacturing method for a frame body that forms a metal frame body, comprising the steps of:
   ring rolling a metal material to form a ring-shaped member;
   pressing and deforming the ring-shaped member in radial directions thereof to form a rectangular member; and
   die forging the rectangular member in a mold to form a frame body,
   wherein when the rectangular member is formed, an angle of a corner portion that imparts the rectangular shape to the rectangular member is made smaller than a prescribed angle in the frame body after die forging.

2. A manufacturing method for a frame body according to claim 1, wherein when the rectangular member is formed, an angle of a corner portion that imparts the rectangular shape to the rectangular member is made smaller than a prescribed angle in the frame body after die forging.

3. A manufacturing method for a frame body according to claim 2, wherein in the step of forming the ring-shaped member, the ring-shaped member is formed so as to have a height in an axial direction equivalent to an integral multiple of a height of the frame body to be formed, and
   the manufacturing method further comprises the step of cutting the rectangular member at a height equivalent to the one frame body after the forming of the rectangular member to be die-forged.

4. A manufacturing method for a frame body according to claim 1, wherein in the step of forming the ring-shaped member, the ring-shaped member is formed so as to have a height in an axial direction equivalent to an integral multiple of a height of the frame body to be formed and
   the manufacturing method further comprises the step of cutting the rectangular member at a height equivalent to the one frame body after the forming of the rectangular member to be die-forged.

5. A manufacturing method for a frame body according to claim 1, wherein the corner portion of the rectangular member which is smaller than the prescribed angle is formed into the prescribed angle of the frame body by the die forging.

6. A manufacturing method for a frame body, that forms a metal frame body, comprising the steps of:
   ring rolling a metal material to form a ring-shaped member;
   pressing and deforming the ring-shaped member in radial directions thereof to form a rectangular member; and die forging the rectangular member in a mold to form a frame body, wherein by the forming of the rectangular member, a convexity which is convex towards an inside of the rectangular member is formed at a middle of a wall portion of the rectangular member by bending.

* * * * *